United States Patent
McGaughy et al.

(10) Patent No.: US 8,093,994 B2
(45) Date of Patent: Jan. 10, 2012

(54) ANIMAL WARNING DEVICE

(76) Inventors: William McGaughy, Thomasville, GA (US); William Craig Lewis, Thomasville, GA (US)

( * ) Notice: Subject to any disclaimer, the term of this patent is extended or adjusted under 35 U.S.C. 154(b) by 444 days.

(21) Appl. No.: 12/454,119

(22) Filed: May 13, 2009

(65) Prior Publication Data
US 2010/0289635 A1 Nov. 18, 2010

(51) Int. Cl.
*G08B 23/00* (2006.01)
*G08B 3/10* (2006.01)

(52) U.S. Cl. .......... 340/384.2; 340/573.2; 116/22 A
(58) Field of Classification Search ........ 340/384.1, 340/384.2, 384.4, 384.7, 573.1, 573.2; 116/22 A; 119/719
See application file for complete search history.

(56) References Cited

U.S. PATENT DOCUMENTS

| | | | |
|---|---|---|---|
| 3,513,326 A * | 5/1970 | Potts | 290/55 |
| 3,943,507 A | 3/1976 | Neal et al. | |
| 4,091,383 A | 5/1978 | Rainville | |
| 4,858,868 A * | 8/1989 | Hoffelner | 248/292.12 |
| 5,278,537 A | 1/1994 | Carlo et al. | |
| 5,418,518 A * | 5/1995 | Schenken et al. | 340/384.1 |
| 5,515,026 A | 5/1996 | Ewert | |
| 5,602,523 A | 2/1997 | Turchioe et al. | |
| 6,252,496 B1 | 6/2001 | Jackson | |
| 6,677,853 B1 | 1/2004 | Canfield | |
| 7,042,340 B2 | 5/2006 | Ewert et al. | |
| 7,113,098 B1 * | 9/2006 | Hayes | 340/573.2 |
| 2003/0071735 A1 | 4/2003 | Hanson et al. | |
| 2005/0040935 A1 | 2/2005 | Ewert et al. | |
| 2005/0210858 A1 * | 9/2005 | Gore et al. | 60/201 |
| 2005/0231338 A1 | 10/2005 | Anderson et al. | |

FOREIGN PATENT DOCUMENTS
TW 200913915 * 4/2009
* cited by examiner

*Primary Examiner* — Van T. Trieu
(74) *Attorney, Agent, or Firm* — William H. Hollimon

(57) ABSTRACT

An animal warning device for emitting a sound that is loud and consistent enough to cause animals to avoid oncoming vehicles. The present invention accomplishes this objective by electrically connecting a speaker to a wind-powered generator. The wind-powered generator is driven by air current striking an impeller. The device is mounted onto a vehicle such that oncoming air current strikes the impeller causing the impeller to rotate. Rotation of the impeller causes the generator to produce a current which powers the speaker. As such, it is unnecessary to connect the animal warning device to an external power source, such as the vehicle's alternator or battery.

16 Claims, 2 Drawing Sheets

ANIMAL WARNING DEVICE

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of animal warning devices. More specifically, the invention relates to a device that attaches to a moving vehicle in order to create a sound that would keep animals away from that vehicle.

2. Description of the Related Art

Animals are currently the cause of a large number of vehicular accidents in the United States. As more roads and highways are built animals become more accustomed to the sound of passing vehicles. Constant exposure to normal highway sounds such as tire noise, wind noise and engine noise cause animals to consider the sounds non-threatening background noise. Although most animals see and hear the vehicles approaching, they often fail to take evasive action in time to avoid causing an accident. Deer are largely the cause of accidents involving animals.

In order to cause an animal to avoid an oncoming vehicle a device is needed to make a sound loud and consistent enough so that the animal will hear and react to the noise. Animal warning devices have not previously been capable of producing a loud enough noise generated by the device itself. If a loud enough noise was able to be produced the noise would remain consistently loud without a fluctuation for speed, thus creating a problem for slow, neighborhood driving or traffic.

What is needed is a device that will fluctuate in volume of sound according to the speed of vehicle. The device should be able to withstand typical driving hazards including bugs, mud, rain, snow and car washes. Additionally, the device should be easy to install with the ability to power itself.

BRIEF SUMMARY OF THE INVENTION

The present invention comprises an animal warning device for emitting a sound that is loud and consistent enough to cause animals to avoid oncoming vehicles. The present invention accomplishes this objective by electrically connecting a speaker to a wind-powered generator. In the preferred embodiment, the wind-powered generator is driven by air current striking an impeller. The device is mounted onto a vehicle such that oncoming air molecules strike the impeller causing the impeller to rotate. Rotation of the impeller causes the generator to produce a current which powers the speaker. As such, it is unnecessary to connect the animal warning device to an external power source, such as the vehicle's alternator or battery.

In the preferred embodiment, the speaker and wind-powered generator are contained within a common housing. The housing can be mounted directly to the vehicle such that the impeller faces in the direction of travel. In an alternate embodiment, the speaker and wind-powered generator are provided as separated components, each component comprising its own housing. This allows the wind-powered generator and the speaker to be mounted at different locations.

REFERENCE NUMERALS IN THE DRAWINGS

| 10 | animal warning device | 12 | generator |
|----|----------------------|----|-----------|
| 14 | shaft | 16 | impeller |
| 18 | protective screen | 20 | fastener |
| 22 | mount posts | 24 | speaker |
| 26 | electronics | 28 | housing |
| 30 | leads | 32 | port |
| 34 | cylinder | 36 | speaker cover |
| 38 | port | | |

DETAILED DESCRIPTION OF THE INVENTION

Figure 1:
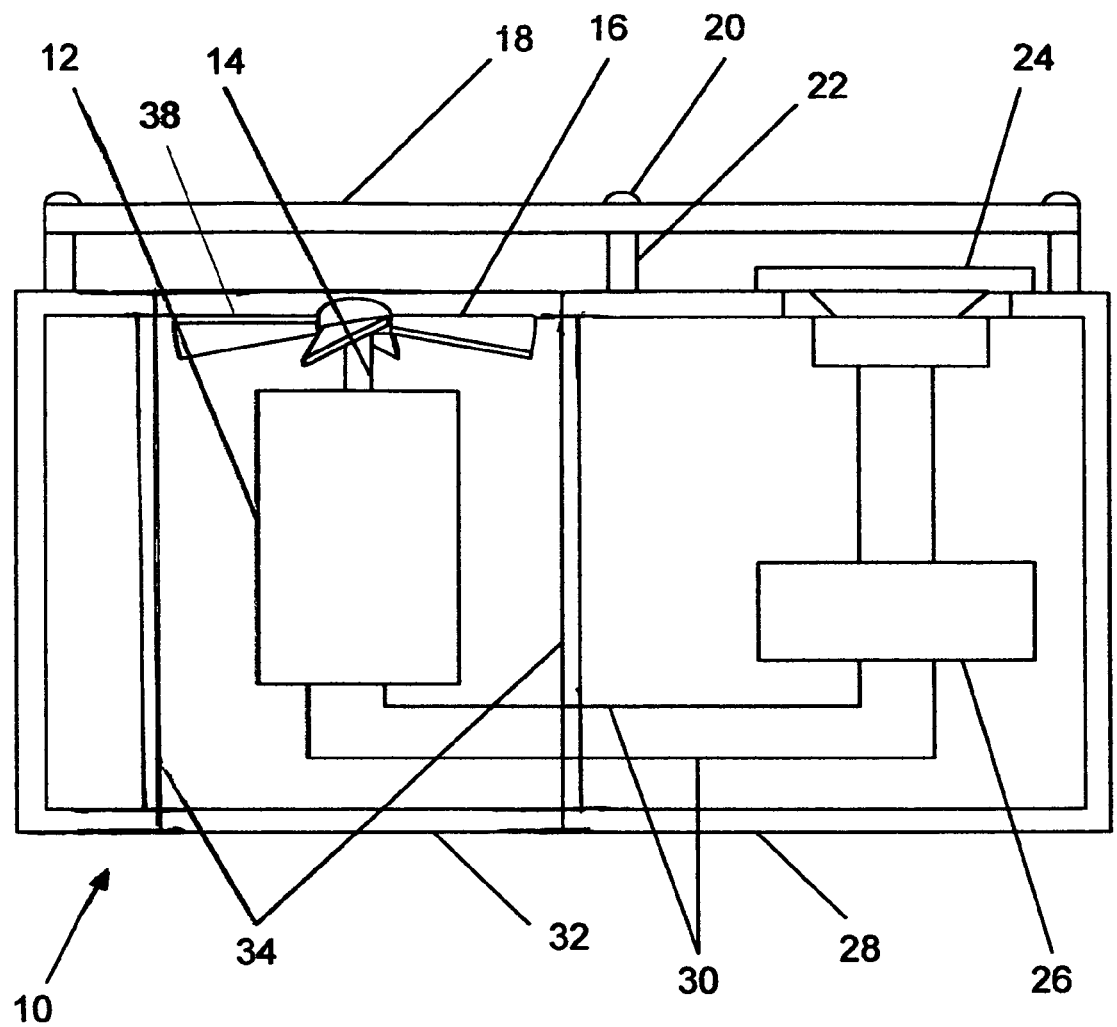
FIG. 1 is a sectioned elevation view, showing the present invention.

The present invention, animal warning device 10, is illustrated in FIG. 1. In the present illustration, the housing 28 is sectioned to show the internal components of the invention. Generator 12 is mounted with conventional mounting hardware (not shown) to housing 28. Impeller 16 is operatively attached to generator 12 by shaft 14. Generator 12 is electrically connected to speaker 24 via leads 30 and electronics 26. Speaker 24 is mounted to the front of housing 28. Electronics 26 contains electronic circuitry to perform the various functions of the present invention as will be described in greater detail subsequently.

Protective screen 18 is attached to the front of housing 28 to protect generator 12 and speaker 24 from rain, mud, and flying debris. Protective screen 18 is preferably "acoustically clear" so as not to block the sound emitted by speaker 24. Protective screen 18 must also be breathable enough to allow oncoming air currents pass through it. Protective screen 18 is attached to housing 28 by fasteners 20 which pass through protective screen 18 into mount posts 22. There are many other ways that protective screen 18 could be mounted to housing 18, however.

Port 38 and port 32 are provided on the front and back surfaces of housing 28, respectively, and a flow path through housing 28 is created by cylinder 34. Port 38 allows oncoming wind to enter housing 28, strike impeller 16, flow through cylinder 34, and exit housing 28 through port 32. Cylinder 34 creates a flow way through housing 28 by extending between the front and back of housing 28 to reduce turbulence as air flows through housing 28. The geometry of cylinder 34 (i.e., symmetrical, converging, or diverging) can be varied to suit particular mounting needs and resulting air flow characteristics.

Figure 2A:
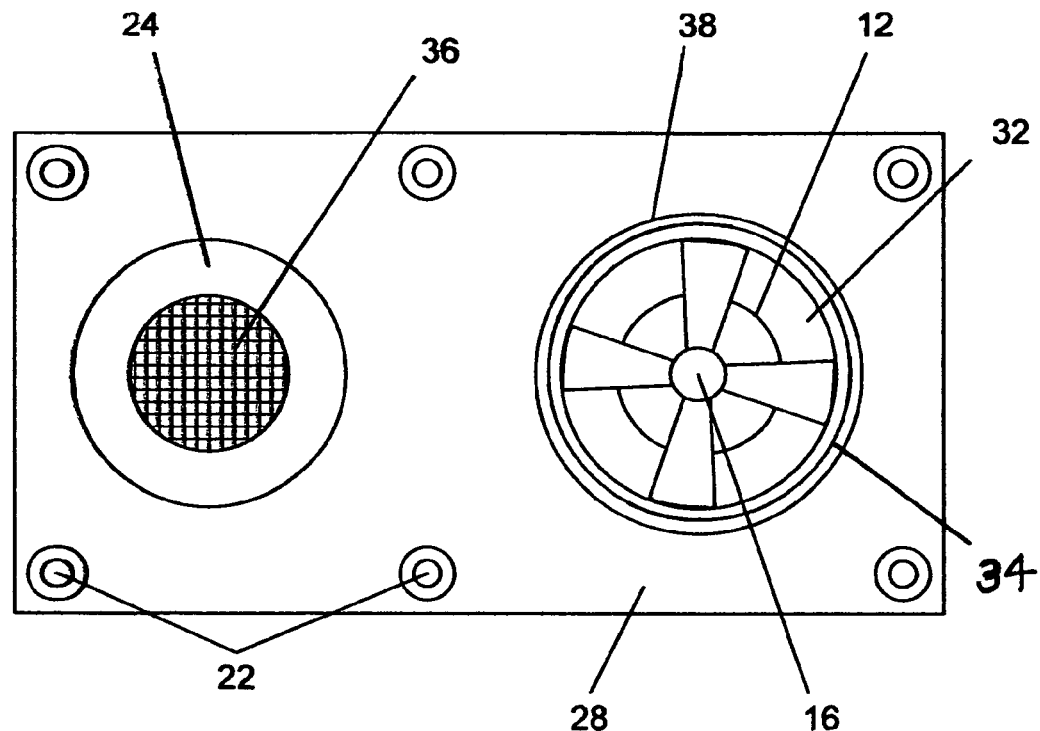
FIG. 2A is a front view, showing the present invention.
Figure 2B:
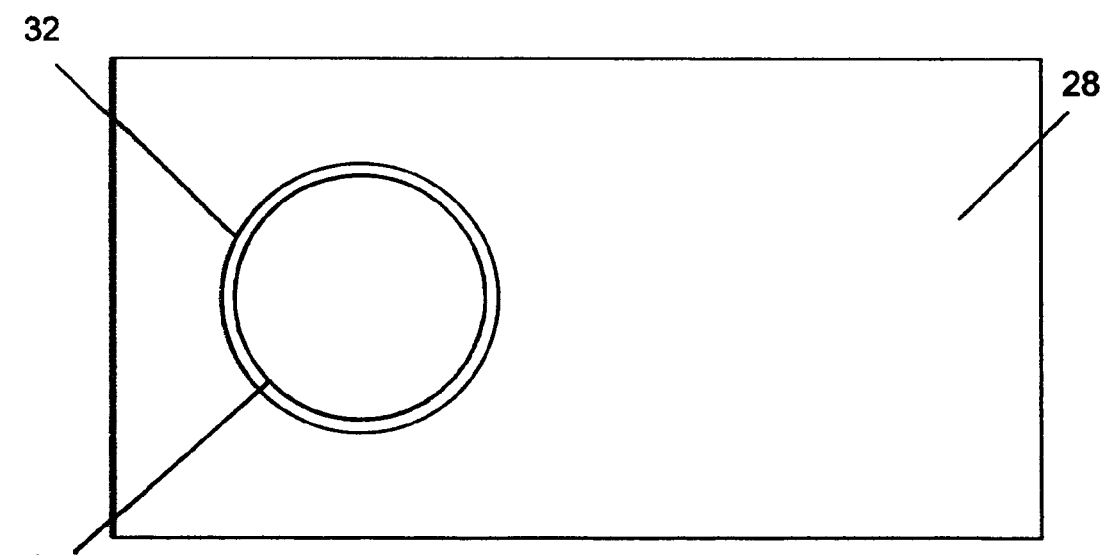
FIG. 2B is a rear view, showing the present invention.

Animal warning device 10 is shown from the front and rear in FIG. 2A and FIG. 2B, respectively. In FIG. 2A, protective screen 18 is removed to better illustrate the components of the invention. Impeller 16 is exposed to oncoming air currents via port 38. The air currents pass around generator 12 and out through port 32. Speaker 24 has speaker cover 36. Like protective cover 18, speaker cover 36 is acoustically clear so as not to impede sound emitted by speaker 24. A plurality of mount posts 22 are provided around the front surface of housing 28 for mounting the protective cover to the surface.

When placed into the wind, impeller 16 spins. Generator 12 produces a variable voltage which varies with the rate of angular rotation of shaft 14. Thus, a simple DC motor may be used for generator 12. Although in normal operation the motor is powered by a DC power source (such as a battery) to turn shaft 14, rotational torque applied to shaft 14 will produce a voltage which is proportional to the rate of rotation of shaft 14. In the preferred embodiment, the device is calibrated such that at about 40 MPH, impeller 16 spins at such a rate that generator 12 produces a voltage of 3V. As the speed of the vehicle increases, impeller 16 spins at a faster rate and generator 12 produces a higher voltage. The higher voltage results in a louder sound emitted from speaker 24. In the preferred embodiment, the following speed and voltage calibrations are used: 3V at 40 MPH; 3.5V at 50 MPH; 4V at 60 MPH; 4.5V at 70 MPH; and 5V at 80 MPH.

In the preferred embodiment, speaker 24 is calibrated to produce a sound level of about 67 DBA at 50 feet and about 58 DBA at 100 feet when receiving a 4.5V signal. At the 4.5V input level speaker 24 can be detected up to 150 yards away. Since the sound is directed towards the front of the vehicle, no sound from the device can be heard with windows up and the device is only slightly audible with the windows down.

Although calibration may largely be accomplished by the design and selection of generator 12 and speaker 24, electronics 26 may be incorporated for tuning animal warning device 10 to produce the desired sound outputs based on the output voltages of generator 12 at the targeted vehicle speeds. In particular, electronics 26 may be used for filtering below-threshold voltages (i.e., voltages corresponding to speeds below the lowest desired vehicle speed for which sound is desired) and amplification. This level of electronic circuitry design is generally known by one that is skilled in the art. Thus, a more thorough discussion of electronics 26 is not provided herein.

The preceding description contains significant detail regarding the novel aspects of the present invention. It should not be construed, however, as limiting the scope of the invention but rather as providing illustrations of the preferred embodiments of the invention. As an example, wind-powered generators of varying configurations may be used in accordance with the teachings of the present invention. Further, while this invention is described as being self contained within a single housing, it is also possible to separate the electrical generation components from the sound generating components into two separate housings which are mounted to the vehicle at different locations. Thus, the scope of the invention should be fixed by the following claims, rather than by the examples given.

We claim:

1. An animal warning device for attachment to a vehicle moving in a direction of travel to alert an animal to the presence of said vehicle comprising:
   a. a housing;
   b. a wind-powered generator contained within said housing, said wind-powered generator driven by an impeller, said wind-powered generator positioned in said housing such that said impeller rotates when said vehicle moves in said direction of travel; and
   c. a sound emitting device electrically connected to and powered by said wind-powered generator, said sound emitting device configured to produce a sound audible to said animal when said vehicle moves in said direction of travel.

2. The animal warning device of claim 1, wherein the volume of said sound emitted by said sound emitting device increases as the speed of said vehicle increases.

3. The animal warning device of claim 1, wherein said sound emitting device is attached to said housing.

4. The animal warning device of claim 1, said housing having a first side facing said direction of travel and a first port opening in said first side, said first port opening configured to allow an oncoming air current pass through said first side of said housing and strike said impeller.

5. The animal warning device of claim 4, said housing having a second side opposite said first side relative to said direction of travel, said second side having a second port opening passing through said second side, said second port opening connected to said first port opening via a flow way to allow said oncoming air current to pass through said first port to exit said housing.

6. The animal warning device of claim 4, further comprising a protective screen covering said first port opening.

7. The animal warning device of claim 1, wherein said sound emitting device includes a speaker.

8. The animal warning device of claim 1, said wind-powered generator having a shaft attached to said impeller such that said shaft rotates with said impeller, wherein rotation of said shaft produces an electric current.

9. An animal warning device for attachment to a vehicle moving in a direction of travel to alert an animal to the presence of said vehicle comprising:
   a. a housing;
   b. a wind turbine disposed within the housing;
   c. a generator mechanically connected to the wind turbine; and
   d. a sound emitting device electrically connected to the generator, wherein said sound emitting device is actuated to emit a sound audible to said animal only in a condition in which said vehicle attains an estimated predetermined minimum vehicle velocity, said condition determined based upon the rate of rotation of said wind turbine.

10. The animal warning device of claim 9, wherein the volume of said sound emitted by said sound emitting device increases as the rate of rotation of said wind turbine increases.

11. The animal warning device of claim 9, wherein said sound emitting device is attached to said housing.

12. The animal warning device of claim 9, said housing having a first side facing said direction of travel and a first port opening in said first side, said first port opening configured to allow an oncoming air current pass through said first side of said housing and strike said wind turbine.

13. The animal warning device of claim 12, said housing having a second side opposite said first side relative to said direction of travel, said second side having a second port opening passing through said second side, said second port opening configured to allow said oncoming air current passing through said first port to exit said housing.

14. The animal warning device of claim 12, further comprising a protective screen covering said first port opening.

15. The animal warning device of claim 9, wherein said sound emitting device includes a speaker.

16. The animal warning device of claim 9, said generator having a shaft attached to said wind turbine such that said shaft rotates with said wind turbine, wherein rotation of said shaft produces an electric current.

* * * * *